HIDEO SUEDA,
TAKESHI YAMAWAKI,
KEIICHI KIDA,
MASAHIRO HAYASHI,
KAZUO ENDO and
MAMORU KANEKO,
INVENTORS United States Patent Office 3,639,553
Patented Feb. 1, 1972

3,639,553
METHOD OF MANUFACTURING SHEETS OF POLYMERIZED RESINOUS MATERIAL
Hideo Sueda, Takeshi Yamawaki, and Keiichi Kida, Tokyo-to, Masahiro Hayashi, Yokohama-shi, Kazuo Endo, Tokyo-to, and Mamoru Kaneko, Yokohama-shi, Japan, assignors to Mitsubishi Kasei Kogyo Kabushiki Kaisha (also trading as Mitsubishi Chemical Industries Limited), Tokyo-to, Japan
Filed July 10, 1969, Ser. No. 840,644
Claims priority, application Japan, July 17, 1968, 43/50,372, 43/50,373, 43/50,374; May 7, 1969, 44/35,050
Int. Cl. B29c 5/00
U.S. Cl. 264—90        21 Claims

ABSTRACT OF THE DISCLOSURE

A method of polymerizing polymerizable resinous material in a cell including a pair of templates and a packing member sandwiched between them. The packing member is made of a compressible thermoplastic material, and by compressing the packing member, subatmospheric pressure is created in the cell, thus firmly holding the templates without using any mechanical clamping means.

BACKGROUND OF THE INVENTION

This invention relates to a method of manufacturing sheets of polymerized resinous materials and more particularly to a method of effectively casting a polymerizable monomer, e.g., vinyl monomer containing a polymerization initiator or a partially polymerized vinyl monomer in a cell or mold of a desired configuration defined by a packing member and two templates clamping the packing member.

Heretobefore, the following methods have been known to pour and polymerize a vinyl monomer or a partial polymerization product thereof:

(1) A method wherein a cell is defined by a packing member, which may be a rectangular endless member, and two glass templates clamped against the packing member by means of a plurality of mechanical clamps which are arranged along three sides of the rectangle. While the assembly is held at an angle with respect to the horizontal with its unclamped side held upward, the glass templates are separated from each other along the cnclamped side, and a special pouring funnel is inserted between the upper glass template and the packing member for pouring a predetermined quantity of liquid monomer or partially polymerized product thereof (hereinafter designated as "syrup") into the cell; the air in the cell being completely removed through the upper edge.

(2) Substantially the same cell as in method (1) is prepared except that the packing member is not an endless configuration but a rectangle with a portion of one side left open, and the clamps are applied along four sides of the rectangle excepting said opened portion. During the pouring step, the cell is held at an angle with the opened portion held upward, and the pouring funnel is inserted through the opened portion of the packing member to pour the syrup into the cell. Thereafter, the opened portion is closed by the packing member to seal the cell, and clamps are applied all around the periphery of the glass templates.

A predetermined number of cells with the syrup poured therein by either one of the above described two methods are mounted upon a suitable table of a carriage and immersed in a polymerization zone containing a water bath maintained at a temperature of 50 to 60° C. This mounting and immersing operation is performed because during the early stage of the polymerization reaction, a large quantity of heat is generated, thereby making it desirable to utilize a water bath to effectively remove heat.

After the elapse of several hours when the degree of polymerization reaches about 80%, the cells are transferred to an air bath tank maintained at a temperature of more than 100° C. to complete the polymerization. After completion of the polymerization reaction, the cells are dismounted from the carriage, the clamps are removed, and the upper glass templates are removed to take out the finished synthetic resin sheets or plates. If necessary, these synthetic resin sheets are heat-treated to remove the strain produced during the polymerization step.

The application and removal of a great many clamps requires much labour and time. Furthermore, as the thickness of the clamped cells increases, the number of cells that can be mounted on a single carriage is reduced. In addition, such mechanical clamps interfere with a belt conveyor utilized to load and unload the cells, so that it is necessary to use a conveyor of a special construction which does not interfere with the clamps.

There is also a problem of frequent transportation of clamps from the station where they are removed to the station where cells are assembled. When polymerizing the syrup in clamped cells immersed in the polymerization zone maintained at about 50 to 60° C., although the respective clamps are adjusted to ensure uniform thickness of the cell due to the expansion of the syrup in the cell, the periphery of the glass templates cannot expand to any appreciable extent but the central portion thereof bulges substantially. Furthermore, as the polymerization reaction proceeds, the specific gravity of the polymer increases so that the volume of the polymer decreases by about 20% from that of the monomer. Due to this volume change occurring during the polymerization step, it is extremely difficult to obtain polymerized resin plates of uniform thickness with cells clamped by mechanical clamps. Further, clamps disturb free circulation of cooling water in the polymerization zone so that portions of the cell are not cooled effectively with the result that the synethic resin plates contain optical strains.

Moreover, in these prior methods of utilizing mechanical clamps, it is necessary to pour the syrup with a pouring funnel of a special configuration, for example, a funnel having a discharge opening which has a cross-section in the shape of a narrow slit. However, due to the relatively high viscosity of the syrup, it is extremely difficult to pour the syrup. Further, as has been described hereinabove, because a thin pouring funnel must be inserted into a small gap, it is very difficult to mechanize the syrup pouring operation. Thus, it has long been desired to provide a simple and effective method of pouring syrup with simple devices without utilising mechanical clamps. Further, in the manufacture of synthetic resin plates of large size by pouring syrup in the cell defined by glass templates, there is the problem of producing plates of non-uniform thickness due to the flexure of the glass templates. This flexure of the glass templates and non-uniformity in the thickness of the product can be reduced by increasing the thickness of the glass templates in proportion to the size thereof but this increases the weight of the cell and the cost of the glass templates. Thus, it is also desirable to solve this problem.

SUMMARY OF THE INVENTION

It is therefore an object of this invention to provide a novel method of manufacturing synthetic resin plates by the casting polymerization technique and by utilizing cells of simple and inexpensive construction. Another object of this invention is to provide a novel method of simply and positively securing the packing member to the template.

Still another object of the present invention is to provide a novel cell for effecting the casting polymerization of a polymerizable syrup without utilizing any mechanical clamps.

Yet another object of this invention is to provide a novel method of supporting a cell for effecting the casting polymerization in such a manner so as to eliminate the non-uniformity in the thickness of the synthetic resin plate produced.

According to this invention, a compressible packing member is secured to one surface of a template which may be a reinforced glass plate to define an enclosure of a suitable configuration, for example a rectangular configuration, and a predetermined quantity of the polymerizable syrup is poured into the enclosure while the template is held horizontally. Thereafter the upper template is placed on the packing member, and a suitable pressure is applied across two templates to compress the packing material and to completely purge the air contained in the cell.

Alternatively, the syrup may be charged into the cell while pressure is applied across the cell to compress the packing member. In any case, once the cell is compressed and the syrup is filled, the templates are securely fixed to the packing member and cannot be removed readily after removal of the applied pressure. This is because when the pressure is relieved, the compressed packing material tends to return to its original configuration, thus tending to increase the volume of the cell. However, as the packing material hermetically adheres to the templates to effectively seal the cell against invasion of external air, the interior is maintained at a subatmospheric pressure. Thus, the templates of the cell are pressed inwardly by a force corresponding to the product of the area of the cell and the difference between the atmospheric pressure and the internal pressure of the cell. This differential pressure is sufficient to firmly hold the templates against lateral movement. The fact that the interior of the cell is maintained at a subatmospheric pressure can be confirmed by air bubbles which are produced when a thin member such as a shim is inserted between the packing member and the template.

It will thus be clear that according to this invention it is possible to effect the casting polymerization of polymerizable resins with very simple cells, without utilizing mechanical clamps, to obtain synthetic resin plates of high quality having a beautiful surface appearance and containing no optical strain.

The packing member utilized in this invention may be of any material so long as it can firmly adhere to the templates to form airtight seals and has sufficient elasticity or restoring force to increase the volume of the cell, thus establishing a partial vacuum in the cell when the external pressure or force is removed. However, the packing material should have such properties that can prevent leakage of the syrup, and can meet the volumetric change of the content, that is, the thermal expansion of the syrup when the cell is immersed in the polymerization zone and the decrease in volume which occurs when the polymerization reaction proceeds. It is preferable to use an elongated strip of thermoplastic materials such as rubber, polyvinyl chloride, particularly plasticized polyvinyl chloride, of any cross-sectional configuration such as a circle or a square. The packing member may be solid or hollow.

To assembly a cell including a packing member arranged in a desired pattern and sandwiched between two glass templates, usually an elongated packing member is cut into a desired length, the opposite ends of the length are joined together into an endless ring and the ring is placed on one of the templates according to a predetermined pattern (usually a rectangle) and then the upper plate is placed against the packing member. Alternatively, without preforming an endless ring, a strip of the packing member may be disposed on the surface of one of the templates to form an enclosure of the desired configuration and the opposite ends of the strip are bonded together (such as by binding with a cord) to form a syrup-tight enclosure. Further the packing member can be secured to the surface of the template with a suitable binder or adhesvie. Further, the packing member can be maintained in the desired pattern by means of hooks connected to the corners of the templates.

The template may be any suitable material such as a chromium plated metal plate, an ordinary glass plate or a reinforced glass plate as long as it has sufficient mechanical strength to withstand forces applied thereto during assemblage and transportation of the cell as well as to withstand heat applied during the polymerization and the drying steps. Further, the templates should have smooth and flat surfaces. Since synthetic resin plates having smooth and glassy surfaces are desired in the art, glass templates are ordinarily used. To this end, reinforced glass plates are satisfactory.

Although any polymerizable resinous material can be polymerized according to this invention, the most suitable raw material comprises a vinyl monomer or a partially polymerized vinyl monomer or mixtures of vinyl monomers of different types. Among the suitable vinyl monomers are included acrylates such as methyl acrylate, ethyl acrylate, butyl acrylate, isobutyl acrylate, 2-ethylhexyl acrylate, n-octyl acrylate; methacrylates such as methyl methacrylate, ethyl methacrylate, butyl methacrylate, n-hexyl methacrylate, lauryl methacrylate and aromatic vinyl compounds such as styrene, $\alpha$-methylstyrene. Further, acrylonitrile, vinyl acetate and the like can also be used.

In view of the appearance, physical properties and workability of the synthetic resin plates, methyl methacrylate or a mixture thereof is employed in most cases. When employing vinyl monomer alone the monomer and its catalyst are poured into the cell. However, as the viscosity of the vinyl monomer is low, it tends to leak through the gap between the packing material and the templates, a partially polymerized vinyl monomer is more advantageous. For instance, methyl methacrylate is partially polymerized with a radical initiator to form a polymerization product having a viscosity of from 0.1 to 5 poise, preferably from about 1 to 3 poise. Alternatively, it is also possible to use a syrup of a suitable viscosity prepared by dissolving a solid polymer in its monomer.

As the polymerization initiator, there may be used any free radical yielding compound soluble in the vinyl monomer, for example organic peroxides, azo-compounds and the like. Among the organic peroxides are included benzoyl peroxide, p-chlorobenzoyl peroxide, lauroyl peroxide, t-butylhydroperoxide, di-t-butyl peroxide and the like. Azo-bisisobutyronitrile, azo-bisisovaleronitrile and the like may also be used. Ordinarily benzoyl peroxide and azo-bisisobutyronitrile are preferred because they do not color the resulting synthetic resin plate, and also because of their suitable decomposition speed and ease of handling. The quantity of the catalyst is from 0.005 to 1% based on the weight of the vinyl monomer, preferably from 0.01 to 0.1%.

To pour the syrup in the cell, it is essential that the packing member be compressed when the pouring operation is completed. The completion of the pouring is herein defined as the moment when the air in the cell is completely expelled therefrom by filling up the cell with the syrup. For example, the packing member is suitably secured to the lower template which is held in the horizontal position and a predetermined quantity of the syrup is then poured into the enclosure defined by the packing member to fill the enclosure. The time required for this pouring is only several seconds. The upper template is then placed to contact the packing member. Thus, the upper template may be placed such that it contacts the entire area of the packing member at the same time or such that it first comes in contact with one side of the enclosure and then gradually comes in contact with the remaining portion of the packing member. Thereafter, suitable pressure is applied to the upper templates to completely expel the air from the cell. To completely remove the air, it is advantageous to insert a thin member such as a metal shim between the upper template and the packing member and to slightly incline the cell so as to bring the air exit passage formed by the spatula shim on the upper side of the cell.

Although it is advantageous, according to the above example, to commence pouring without compressing the packing member and to compress it a little before completion of the pouring operation, it may be possible to charge the syrup while the packing member is being compressed. For example, the pouring of the syrup may be carried out in the following manner. Where an endless packing member is used, the cell is held inclined and a narrow elongated funnel is inserted between the packing member and the upper template. When a predetermined quantity of the syrup has been admitted through the pouring funnel, the funnel is removed, and pressure is gradually increased on the templates to compress the packing member and to purge the air. Where the packing member is applied with a portion of one side left open, the cell is inclined with the opening up, and pressure is applied to both templates to remove air through the opening, and the packing member is compressed. After completely filling the cell, opposite ends of the packing member are firmly tied together by a cord. Even when an endless packing member is used by providing a suitable opening through the packing member that can be closed after pouring, the syrup can be filled in a similar manner.

While the magnitude of the pressure applied to the templates during pouring varies dependent upon the type of the packing member used, it can be applied by any suitable means. Although it is advantageous to use a suitable press, clamps may be applied around the periphery of the templates. Such pressure can also be applied by hand if the size of the cell and the magnitude of the applied pressure permit. If the compression of the packing material is too small, volumetric expansion of the cell due to the repulsive or restoring force of the packing member will be small thus causing insufficient subatmospheric pressure. On the other hand, too large compression results in a squeezing of the syrup out of the cell. For this reason, it is preferable to apply a pressure sufficient to reduce the diameter of the packing member by more than 10%. After completion of the pouring of the syrup, the applied pressure is removed and the cell is transferred to the polymerization zone.

Usually, the early stage of polymerization is carried out in a water bath while the later stage in an air bath. Although during both stages of the polymerization, cells may be loaded on a carriage, it is advantageous to unload the cells from the carriage before they are transferred into the air bath and to load them on a conveyor.

As above mentioned, as the size of the synthetic resin sheet increases, there is a tendency to form sheets of non-uniform thickness due to the flexure of the templates. More particularly, the central portion of the sheet is thinner than the peripheral portion. According to this invention, this problem is solved by providing a continuous or discontinuous supporting means around the periphery of the lower template. With this arrangement, both upper and lower templates flex in the same direction in an equal amount thus assuring the production of synthetic resin sheets of uniform thickness.

So long as the lower surface of the lower template is suitably spaced from the upper surface of the supporting table of a carriage by means of the supporting means, the material and configuration of the supporting means are not critical. Thus, the material may be rigid such as iron, aluminum, rigid plastics and the like or elastic materials such as rubber, urethane foam, soft plastics, etc. but the latter materials are preferred. A supporting means of any cross-sectional area such as a circular, a square or rectangular cross-section, etc. may be used so long as the supporting means can be positioned within a predetermined range described later. Also the thickness of the supporting means does not affect the desired uniformity of the thickness of the synthetic-resin sheet, but where urethane foam is used, it is preferable to use a urethane foam supporting means having a thickness of several centimeters. For other materials, a thickness of several millimeters is sufficient. The supporting means should be positioned along the periphery of the template in a region having a width of less than $\frac{1}{7}$ of the length of the respective sides of the template. If the supporting means are positioned more closely to the center of the sheet, uniformity in the thickness of the synthetic resinous plate will not be ensured.

The packing member should also be positioned in the similar region. Although the packing member may be positioned either on the outside or inside of the supporting means, when considering the size and uniformity of the resulted synthetic resin sheet, it is preferable to place the packing material on the outside.

This invention further provides a novel method of firmly securing the packing member to the template in a short time. This object can be readily accomplished by heating a packing member to make it sticky and pressing it against the template.

Accordingly, the material of the packing member should have such properties that it can firmly adhere to the template, and can withstand expansion and contraction inherent to the polymerization of the syrup. For this reason, packing members in the form of pipes made of thermoplastic substance, particularly soft vinyl chloride resins including vinyl chloride copolymers are preferred. Although the softening temperature of vinyl chloride resins varies dependent upon the type and quantity of the plasticizer employed, usually when heated to 50° to 180° C., piper of soft vinyl chloride resins soften to become sticky at their surface but they still retain sufficient resiliency just like rubber. Such a softened state manifesting surface stickiness is herein termed as sticky or plastic.

It is preferable to preheat the template to a temperature of more than 30° C., preferably 40° C. in order not to rapidly cool the sticky packing member when it is applied. However, as too high a preheating temperature requires longer cooling time it is preferable to limit the preheating temperature to less than 70° C., preferably less than 60° C. Actually, however, a special preheating step is not necessary because templates are generally subjected to a high temperature drying step and are suitably cooled while they are transferred by means of a belt conveyor from the drying furnace to the station where packing members are applied.

As will be described later in detail any suitable means may be used to urge the sticky packing member against the template.

DESCRIPTION OF THE PREFERRED EMBODIMENTS

Figure 1:
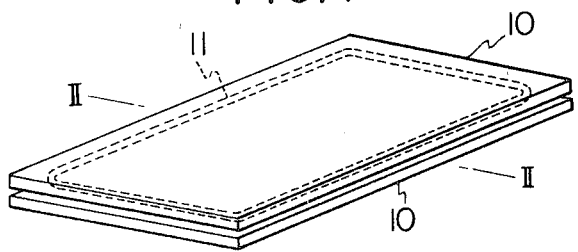
FIG. 1 is a perspective view of a cell utilized to carry out the method of this invention.
Figure 2:
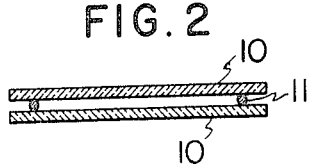
FIG. 2 is a cross-sectional view of the cell shown in FIG. 1 taken along a line II—II.
Figure 3:
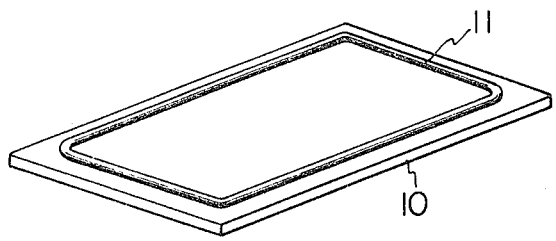
FIG. 3 is a perspective view of a glass template and a packing member secured to one surface thereof.

The following specific examples are given by way of illustration and are not to be construed as limiting in any way the scope and spirit of the invention.

EXAMPLE 1

A polished reinforced glass plate (1420 x 1160 x 9.7 mm.) having hooks at four corners was placed substantially horizontally. Opposite ends of a packing member of a soft polyvinyl chloride pipe (outer diameter of 4.5 mm., inner diameter of 3.0 mm. and length of 4900 mm.) were bonded together to form an endless ring, and the ring was formed into a rectangle and secured to the upper surface of the glass template by the hooks, thus defining a rectangular enclosure. Then, 3.5 kg. of a partially polymerized methylmethacrylate containing a suitable polymerization catalyzer was poured in the enclosure, and the upper glass plate identical to the lower glass plate was placed on the packing member. The cell thus fabricated was inclined about 1° with respect to the horizontal and pressure was applied across the cell. A thin stainless shim was inserted between the upper glass plate and the packing member at the upper side thereof to purge air. The shim was removed when the final air bubble was purged. Casting was completed within 40 seconds. Then, without applying any clamp, the cell was transferred to a polymerization tank and the resin was polymerized in the conventional manner.

CONTROL EXAMPLE

A packing member consisting of a soft polyvinyl chloride pipe identical to that used in Example 1 was sandwiched between two glass plates identical to those of Example 1. The packing member was disposed in the shape of a rectangle with a portion of one side left open. Mechanical clamps were applied along the periphery of the cell except the side including the opening. Eleven clamps were used to set the gap between glass plates to 2.4 mm., and the cell was inclined about 30° with respect to the horizontal with the side including the opening upper side.

Then 3.5 kg. of the same partially polymerized methylmethacrylate was poured in the cell over a period of 18 minutes. After casting, opposite ends of the packing member were bound by a cord to close the cell. Then addiitonal clamps were applied to the remaining side. The total time required for casting and clamping was 25 minutes which should be compared with 40 seconds in Example 1.

Thus, the conventional casting method shown in the control example is more complicated and requires more time than the method of this invention.

EXAMPLE 2

1 g. of α,α'-azo-bisisobutyronitrile was incorporated into 2 kg. of methylmethacrylate and the mixture was heated for 15 minutes at a temperature of 80° C. to effect partial polymerization. Two glass templates, each 40 cm. x 40 cm. x 1 cm., and a packing member consisting of a soft vinyl chloride pipe, 5 mm. outside diameter and 3 mm. inside diameter were used to assemble a cell. The cell was laid horizontally, the upper template was removed, said partially polymerized compound was poured in the enclosure bounded by the packing member, the upper template was placed on the packing member, and pressure was applied across templates to compress the packing member while the cell was held slightly inclined to purge air from the cell thus completing casting. When compressed, the outer diameter of the packing member was reduced from 5 mm. to 2.4 mm. and restored to 2.48 mm. when the pressure was removed. It will thus be noted that a subatmospheric pressure was established within the cell so that the templates were firmly clamped against the packing member by the differential pressure without using any mechanical clamps. In fact it was impossible to readily remove or move laterally the templates, nor was there permeation of air. The filled cell was placed horizontally in a water bath of 60° C. to commence the polymerization reaction.

After polymerization for 4 hours in the water bath, the cell was transferred into an air heating furnace maintained at 130° C. and the polymerization reaction was continued for an additional two hours. After cooling, the resulted resin sheet was taken out of the cell and the thickness was measured. The thickness error was less than 0.05 mm. and the sheet was smooth and glassy.

The syrup can also be effectively cast in the cell while the cell is held upright or slightly inclined with respect to the vertical.

Thus, a packing member identical to that described in this example was placed on the lower template to form a rectangular enclosure, a portion of one side being left open for casting the syrup. The upper templates were placed on the packing member and the periphery of the cell was clamped by a number of mechanical clamps until the diameter of the packing member was reduced to 2.4 mm. Then the cell was raised up to bring the opening to upper side and the same quantity of the same syrup was poured in the cell. After pouring, the opening was closed as before and the clamps were removed to permit the packing member to expand to the outer diameter of 2.8 mm. to establish a partial vacuum in the cell. Thereafter, the cast cell was treated in the same manner as before to obtain an excellent resin sheet.

EXAMPLE 3

The process of Example 2 was repeated except that 0.2 g. of α,α'-azo-bisisobutyronitrile was dissolved in 350 g. of methylmethacrylate and the solution was substituted for the partially polymerized methylmethacrylate to obtain a resin sheet of uniform thickness. The syrup was also poured in a vertical cell to obtain the same result.

EXAMPLE 4

0.2 g. of benzoyl peroxide was dissolved in a mixture of 315 g. of methylmethacrylate and 35 g. of ethylacrylate and the resulted mixture was reacted for 15 minutes at a tempreature of 80° C. to obtain a syrup having a viscosity of 18 poise. The entire quantity of the syrup was poured in a cell comprising a pair of glass templates, each 40 cm. x 40 cm. x 1.0 cm., and a soft vinyl chloride resin pipe of 4 mm. outer diameter and 2 mm. inner diameter. Pressure was applied to the cell to compress the packing material to reduce its outer diameter to 2.4 mm. After complete removal of the air, pressure was relieved to permit the packing member to resume an outer diameter of 2.8 mm. The cast cell was maintained in an air circulation type bath maintained at 60° C. for 4.5 hours to polymerize the syrup. Thereafter, the cell was heated at a temperature of 130° C. for an additional two hours to complete polymerization. Any trace of air which might have permeated into the cell or resin sheet was not noted and the resulting sheet was clear, transparent and of high quality.

The syrup of this example was also cast in a vertical cell with equal results.

EXAMPLE 5

The process of Example 3 was repeated except that methylmethacrylate was substituted by 315 g. of styrene incorporated with 0.4 g. of α,α'-azo-bisisobutyronitrile. The filled syrup was polymerized in a water bath for 40 hours and then further polymerized in air at a temperature of 100° C. for five hours to obtain a polystyrene resin sheet.

The syrup of this example was also cast in a vertical cell to obtain equal results.

EXAMPLE 6

2 g. of α,α'-azo-bisisobutyronitrile was admixed with 4 kg. of methylmethacrylate and the mixture was heated at a temperature of 85° C. for 15 minutes to effect partial polymerization. Two sheets of glass templates each 1420 mm. x 1170 mm. x 10 mm., and a packing member consisting of a soft vinyl chloride pipe of 4.5 mm. outer diameter and 3 mm. inner diameter were used to assemble a cell. The cell was laid horizontally, the upper template was removed, 3.5 kg. of the partially polymerized methylmethacrylate was poured in the enclosure surrounded by the packing member, the upper template was again placed in position, pressure was applied while the cell was held slightly inclined to compress the packing member and to purge the air in the cell. After complete removal of the air the pressure was removed to permit the packing member to expand.

Figure 6:
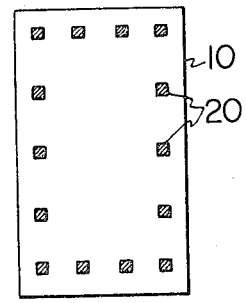

The resulted cell was supported on urethane foam supporting means 20, each 50 mm. x 50 mm. x 30 mm., and arranged as shown in FIG. 6. These supporting means were spaced 50 mm. from respective sides of the template 10. Then, the supported cell was immersed horizontally in a water bath of 60° C. to commence polymerization. The polymerization reaction was continued for 4 hours in the water bath and then for 2 hours in an air heating furnace maintained at a temperature of 130° C. After cooling, the resin sheet was taken out and its thickness was measured. The thickness was 2 mm., and thickness error or differential was only 0.24 mm. This error is to be compared with the permissible errors of +0.5 and −0.3 mm. or 0.8 mm. for a first class 2 mm. thick sheet. The difference between the thickness at the central portion and the average thickness of the resin sheet was only 0.05 mm.

EXAMPLE 7

The process of Example 6 was repeated except nitrile rubber supporting means, each 40 mm. x 40 mm. x 4 mm. was used. The thickness error of a 2 mm. thick synthetic resin sheet was 0.51 mm.

EXAMPLE 8

The process of Example 6 was repeated except that iron plates of 30 mm. x 30 mm. x 3 mm., each, were used as the supporting means. The thickness error of a 2 mm. synthetic resin sheet was 0.59 mm.

EXAMPLE 9

Figure 5:
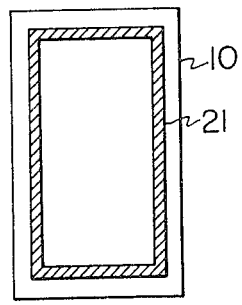

The process of Example 6 was repeated except that a plurality of urethane foam supporting pieces, 50 mm. x 50 mm. x 30 mm., each, were arranged side by side to form a continuous rectangular supporting means 21 as shown in FIG. 5. The supporting means was spaced 50 mm. from respective sides of the glass template 10. The thickness error of a 2.2 mm. synthetic resin sheet was 0.61 mm.

EXAMPLE 10

The process of Example 9 was repeated except that an iron pipe of 3 mm. outside diameter was used. The thickness error of a 2 mm. synthetic resin sheet was 0.69 mm.

EXAMPLE 11

Figure 7:
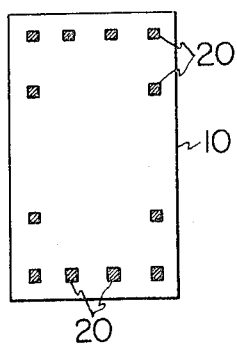

5 g. of α,α'-azo-bisisobutyronitrile was incorporated into 10 kg. of methylmethacrylate and the mixture was reacted at a temperature of 85° C. for 15 min. to obtain a partially polymerized compound. A cell was assembled by utilizing two sheets of glass templates of the same size as in Example 6 and a packing member consisting of a soft polyvinyl chloride pipe, 10 mm. outer diameter and 7 mm. inner diameter. 8.7 kg. of the partially polymerized methylmethacrylate was poured in the cell which was supported by a urethane foam supporting means 20, each 50 mm. x 50 mm. x 30 mm., which were arranged as shown in FIG. 7 and spaced 50 mm. from the respective sides of the glass templates 10. After polymerization, a synthetic sheet of a substantially uniform thickness of 5 mm. was obtained, and the thickness error or differential was 0.46 mm. From this it will be seen that this sheet is very excellent when one considers that the permissible error or differential thickness for a first class sheet of 5 mm. thick is ±0.7 mm. or 1.4 mm.

EXAMPLE 12

The filled cells were polymerized under the same conditions and supported in the same manner as in Example 6 except that cells were inclined 1°, 5° and 7°, respectively, with respect to the horizontal. In each case, the water in the water bath did not enter into the cell and a resin sheet of uniform thickness of 2 mm. was obtained. The thickness error of each sheet is shown in the following Table 1.

Table 1

| Inclination angle: | Thickness error, mm. |
| --- | --- |
| 1° | 0.35 |
| 5° | 0.43 |
| 7° | 0.60 |

EXAMPLE 13

2 g. of α,α'-azo-bisisobutyronitrile was added to a mixture consisting of 3 kg. of methylmethacrylate and 0.5 g. of ethylacrylate and the resulted mixture was reacted at a temperature of 85° C. for 15 minutes to obtain a partially copolymerized compound. Supporting means of urethane foam 20, 50 mm. x 50 mm. x 30 mm., each, were disposed as shown in FIG. 7. The spacing between two innermost members on both longer sides was 650 mm. In other respects, the process of Example 6 was repeated. The thickness error of the resulting 2 mm. thick resin sheet was 0.37 mm.

EXAMPLE 14

Figure 8:
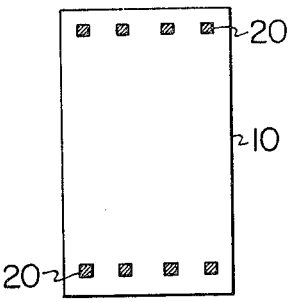

The process of Example 6 was repeated except that urethane foam supporting means 20, each 50 mm. x 50 mm. x 30 mm., were arranged on the upper and lower sides along of the template 10 as shown in FIG. 8. These supporting means were spaced 110 mm. from the upper and lower side edges, respectively. The thickness error of the resulting 2 mm. thick resin sheet was 0.60 mm.

EXAMPLE 15

The process of Example 14 was repeated except that supporting means were made of iron plates of 4 mm. thick and were spaced 50 mm. from upper and lower sides, respectively. The thickness error of the resulting resin sheet was 0.61 mm.

EXAMPLE 16

Figure 9:
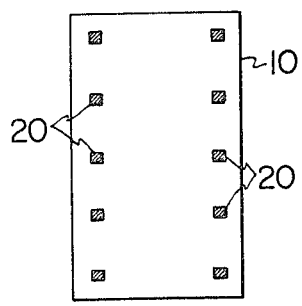

The process of Example 6 was repeated except that urethane foam supporting means 20, each 50 mm. x 50 mm. x 15 mm., were disposed on the left and right hand sides of the template 10 as shown in FIG. 9. These supporting means were spaced 50 mm. from left and right hand sides respectively. The thickness error of the resulting 2 mm. thick resin sheet was 0.48 mm.

From Examples 6 to 16 inclusive described above, it will be seen that the spacing between supporting means and their associated sides of the template is generally less than 1/7 of the length thereof. It was noted that the thickness error of the resulted resin sheets increases in proportion to said spacing. For example, in Example 6, if supporting members were arranged according to the pattern shown in FIG. 5 and spaced 210 mm. from upper and lower sides and 175 mm. from left and right sides of the template, the thickness error of a 2 mm. resin sheet was increased to 0.80 mm. In the same manner, in Example 14, when the spacing between supporting members and the associated sides of the template was increased to 210 mm. the thickness error was increased to 0.85 mm. Further, in Example 6 when the cell was supported by a grid shaped supporting means (not shown), the resulting resin sheet was thin at the central portion but thick at the peripheral portion, the thickness error being 1.1 mm.

As has been discussed in Example 12, the cell may be inclined slightly during the polymerization reaction but when the inclination angle was increased to 15° with respect to the horizontal it was noted that the syrup leaked out of the cell and hence the desired resin sheet was not obtained.

The following examples are shown to illustrate the use of packing members of thermoplastic materials and a novel method of securing the same on the lower template according to the desired pattern.

EXAMPLE 17

Figure 4:
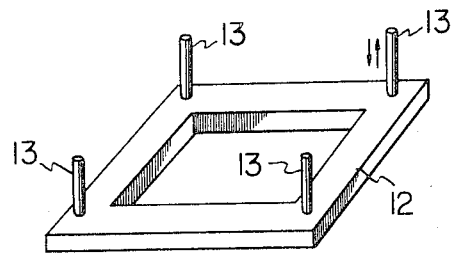
FIG. 4 is a perspective view of a device utilized to force the sticky packing member against the template, and FIGS. 5 to 9, inclusive, illustrate various arrangements of the supporting means.

A glass template, 1420 mm. x 1160 mm. x 9.5 mm. was preheated to 40° C. and laid horizontally. An endless packing member was prepared by joining opposite ends of a commercially available soft vinyl chloride pipe, 5 mm. outer diameter, 3 mm. inner diameter and 4480 mm. long, heated for one minute in an air bath of 110 C. and then so placed to surround four vertical rods 13 of a rectangular frame 12 (FIG. 4) which may be made of any suitable material such as iron, aluminum, stainless steel, chromium plated metal, wood, vulcanized rubber, polypropylene polyethylene, nylon and glass (where glass is used, it is heated to a temperature of less than 30° C.). Rods 13 may be made of the same material as the frame and the length thereof should be slightly shorter than the diameter of the packing member.

Alternatively, as shown by arrows, rods 13 may be slidably inserted into frame 12. Then the frame was inverted and pressure was applied thereto for 10 minutes to cause the packing member to become sticky and fuse to the lower template. Where the frame 12 was made of wood of 50 mm. thick and rods 13 were of glass and slidably inserted in the frame, the weight of the frame itself was sufficient for this purpose and the frame could be handled by a single operator. When the frame 5 was raised, the packing member was left securely adhered to the template. Then 3.55 kg. of methylmethacrylate containing a suitable initiator was poured into the enclosure bounded by the packing member. It was found that no syrup leaked through the interface between the packing member and the template. Moveover, according to this example the packing member could be secured to the template in less than 10 seconds. Without utilizing frame 5, 1⅓ min. was required for two skilled operators to firmly clamp the packing member between two opposed templates. The filled cell was treated in the same manner as in the previous examples.

EXAMPLES 18–22

The process of Example 17 was repeated except that the frames of different materials as shown in the following Table 2 were used.

TABLE 2

| Example | Material of the frame | Thickness, mm. | Force applied to the packing member |
|---|---|---|---|
| 18 | Polypropylene | 5 | Weight of the frame plus 40 kg. |
| 19 | Stainless steel | 10 | Weight of the frame. |
| 20 | Chromium plated iron | 10 | Do. |
| 21 | High density polyethylene | 5 | Weight of the frame plus 40 kg. |
| 22 | Vulcanized rubber | 10 | Do. |

In each case a packing member of soft vinyl chloride pipe was firmly adhered to the glass template and no leaking of the cast syrup was noted.

EXAMPLES 23–25

The same process and materials as in Example 17 were used but heating temperatures and heating times were varied as shown in the following Table 3.

TABLE 3

| Example | Heating temp. (° C.) | Heating time (min.) |
|---|---|---|
| 23 | 130 | 1 |
| 24 | 90 | 3 |
| 25 | 50 | 10 |

In each case, the packing member was firmly secured to the template.

What is claimed is:

1. A method of casting a polymerizable resinous material in a cell including a pair of templates placed on opposite sides of a compressible packing member capable of adhering to the templates to form an air and resinous material-tight seal and having sufficient elasticity to meet volumetric changes in the cell, which comprises pouring said polymerizable resinous material in an enclosure in said cell bounded by said packing member and said pair of templates and completing said pouring while said packing member is being compressed by the application of pressure across said cell sufficient to reduce the diameter of said packing member, relieving said pressure to permit said packing member to expand to a diameter smaller than its original diameter thus creating a partial vacuum in said cell sufficient to hold said templates firmly pressed against said packing member, and transferring said cell into a polymerization zone to polymerize said resinous material.

2. The method according to claim 1, wherein the material of the templates is selected from the group consisting of glass, reinforced glass, metal, and metal plated lymerize said resinous material.

3. The method according to claim 1 wherein said polymerizable resinous material consists essentially of a vinyl monomer or a partially polymerized vinyl monomer mixed with a polymerization initiator.

4. The method according to claim 3 wherein said polymerization initiator is a free radical yielding a compound soluble in the vinyl monomer.

5. The method according to claim 3 wherein said polymerizable resinous material is at least one vinyl monomer selected from the group consisting of acrylates, methacrylates, aromatic vinyl compounds, acrylonitrile and vinyl acetate.

6. The method according to claim 5 wherein said vinyl monomer is methyl methacrylate.

7. The method according to claim 1 wherein said packing member is made of a thermoplastic material.

8. The method according to claim 7 wherein said packing member is a polyvinyl chloride resin.

9. The method according to claim 7 wherein said packing member is bonded to a first template by heating.

10. A method of casting a polymerizable resinous material in a cell including a pair of templates placed on opposite sides of a compressible packing member capable of adhering to the templates to form an air and resinous material-tight seal and having sufficient elasticity to meet volumetric changes in the cell which comprises securing said compressible packing member to a first template placed horizontally, pouring said polymerizable resinous material into an enclosure bounded by said packing member and said first template, placing the other template on said packing member to form said cell, applying pressure across said cell sufficient to reduce the diameter of said packing member and remove the air from said cell but insufficient to squeeze resinous material out of said cell, relieving said pressure to permit said packing member to expand to a diameter smaller than its original diameter thus creating a partial vacuum in said cell sufficient to hold said templates firmly pressed against said packing member and transferring said cell into a polymerization zone to polymerize said resinous material.

11. The method according to claim 10 wherein the material of the templates is selected from the group consisting of glass, reinforced glass, metal and metal plated with harder metals.

12. The method according to claim 10 wherein said packing member is made of a thermoplastic material.

13. The method according to claim 10 wherein said packing member is a polyvinyl chloride resin.

14. The method according to claim 10 wherein said polymerizable resinous material consists essentially of a vinyl monomer or a partially polymerized vinyl monomer mixed with a polymerization initiator.

15. The method according to claim 14 wherein said polymerization initiator is a free radical yielding a compound soluble in the vinyl monomer.

16. The method according to claim 14 wherein said packing member is bonded to the lower template by heating.

17. The method according to claim 14 wherein said polymerizable resinous material is at least one vinyl monomer selected from the group consisting of acrylates, methacrylates, aromatic vinyl compounds, acrylonitrile and vinyl acetate.

18. The method according to claim 17 wherein said vinyl monomer is methyl methacrylate.

19. The method according to claim 10 wherein said first template is supported by supporting means positioned around its bottom periphery.

20. The method according to claim 19 wherein said supporting means is located in a region having a width of less than $1/7$ of the length of the respective sides of said first template.

21. The method according to claim 19 wherein said supporting means is an elastic material.

References Cited

UNITED STATES PATENTS

| | | | |
|---|---|---|---|
| 3,056,166 | 10/1962 | Weinberg | 264—1 X |
| 3,337,659 | 8/1967 | Grandperret | 264—1 |
| 3,551,541 | 12/1970 | Rossetti | 264—102 |

ROBERT F. WHITE, Primary Examiner

J. H. SILBAUGH, Assistant Examiner

U.S. Cl. X.R.

264—219, 313, DIG. 78